(12) United States Patent
Aslan et al.

(10) Patent No.: US 7,309,157 B1
(45) Date of Patent: Dec. 18, 2007

(54) APPARATUS AND METHOD FOR CALIBRATION OF A TEMPERATURE SENSOR

(75) Inventors: Mehmet Aslan, Sunnyvale, CA (US); Chungwai Benedict Ng, Mountain View, CA (US); Eric Tam, San Jose, CA (US); Qing Feng Ren, San Jose, CA (US); Dan D'Aquino, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 152 days.

(21) Appl. No.: 10/952,514

(22) Filed: Sep. 28, 2004

(51) Int. Cl.
*G01K 1/20* (2006.01)
*G01K 7/01* (2006.01)

(52) U.S. Cl. .................... 374/178; 374/172; 374/1; 702/130; 702/99; 327/513

(58) Field of Classification Search ................ 374/170, 374/171, 172, 178, 1, 183; 327/512–513; 702/130, 133, 99
See application file for complete search history.

(56) References Cited

U.S. PATENT DOCUMENTS

| | | | | |
|---|---|---|---|---|
| 4,165,642 A | * | 8/1979 | Lipp | 374/170 |
| 4,224,537 A | * | 9/1980 | Glazer | 327/512 |
| 4,713,783 A | * | 12/1987 | Fletcher | 702/133 |
| 5,519,354 A | * | 5/1996 | Audy | 327/512 |
| 5,530,612 A | * | 6/1996 | Maloney | 361/56 |
| 5,815,410 A | * | 9/1998 | Heinke et al. | 702/135 |
| 5,838,578 A | * | 11/1998 | Pippin | 716/4 |
| 5,857,777 A | * | 1/1999 | Schuh | 374/172 |
| 5,961,215 A | * | 10/1999 | Lee et al. | 374/178 |
| 6,006,169 A | * | 12/1999 | Sandhu et al. | 702/132 |
| 6,008,685 A | * | 12/1999 | Kunst | 327/512 |
| 6,016,051 A | * | 1/2000 | Can | 323/315 |
| 6,121,824 A | * | 9/2000 | Opris | 327/539 |
| 6,137,341 A | * | 10/2000 | Friedman et al. | 327/513 |
| 6,149,299 A | | 11/2000 | Aslan et al. | |
| 6,169,442 B1 | * | 1/2001 | Meehan et al. | 327/513 |
| 6,183,131 B1 | * | 2/2001 | Holloway et al. | 374/172 |

(Continued)

OTHER PUBLICATIONS

National Semiconductor Corporation, "± 0.75° C Accurate, Remote Diode and Local Digital Temperature Sensor with Two-Wire Interface", LM86, Apr. 2003, pp. 1-21.

(Continued)

*Primary Examiner*—Gail Verbitsky
(74) *Attorney, Agent, or Firm*—Darby & Darby PC; Matthew M. Gaffney

(57) ABSTRACT

A circuit for temperature sensing provides a bias current to a PN junction, and the PN junction provides a PN junction voltage in response to the bias current. Also, a parasitic resistance may be coupled in series with the PN junction. The circuit for temperature sensing is configured to determine the temperature of the PN junction based on the PN junction voltage. Further, the circuit includes registers which store ηtrim, which is based on the difference between the non-ideality of the PN junction used from a reference PN junction; ΔI, which is based on the difference between a reference bias current and the bias current for the part; Rtrim, which is based the parasitic resistance; and Ntrim, which includes other offsets. The registers may be set during trimming and/or calibration to provide accurate temperature sensing for the parameters employed.

20 Claims, 3 Drawing Sheets

U.S. PATENT DOCUMENTS

| | | | |
|---|---|---|---|
| 6,191,646 B1* | 2/2001 | Shin | 327/543 |
| 6,255,807 B1* | 7/2001 | Doorenbos et al. | 323/314 |
| 6,275,098 B1* | 8/2001 | Uehara et al. | 327/539 |
| 6,480,127 B1* | 11/2002 | Aslan | 341/119 |
| 6,554,469 B1* | 4/2003 | Thomson et al. | 374/178 |
| 6,870,418 B1* | 3/2005 | Tang et al. | 327/513 |
| 7,083,328 B2* | 8/2006 | Johnson | 374/178 |
| 2003/0031229 A1* | 2/2003 | Zhang et al. | 374/178 |
| 2003/0123520 A1* | 7/2003 | Tesi | 374/178 |
| 2004/0065900 A1* | 4/2004 | Umemoto et al. | 257/200 |
| 2005/0099752 A1* | 5/2005 | Liepold et al. | 361/103 |
| 2005/0259718 A1* | 11/2005 | Phan et al. | 374/178 |
| 2006/0029123 A1* | 2/2006 | Johnson | 374/178 |
| 2006/0071733 A1* | 4/2006 | Hsu | 331/176 |
| 2006/0093016 A1* | 5/2006 | McLeod et al. | 374/178 |

OTHER PUBLICATIONS

Analog Devices, Inc., "Intelligent Temperature Monitor and PWM Fan Controller", ADM 1030, 2003, pp. 1-28.

* cited by examiner

APPARATUS AND METHOD FOR CALIBRATION OF A TEMPERATURE SENSOR

FIELD OF THE INVENTION

The invention is related to temperature sensing, and in particular, but not exclusively, to a method and apparatus of calibrating and/or trimming a diode non-ideality error and bias current error.

BACKGROUND OF THE INVENTION

Temperature measurements can be made by applying a current to a forward-biased PN junction and measuring the resulting potential across the PN junction. Further, temperature calculations can be made by determining the voltage difference that results as a function of different applied currents across a PN junction, using differing areas of PN junctions to which a current is applied, or a combination of both.

BRIEF DESCRIPTION OF THE DRAWINGS

Non-limiting and non-exhaustive embodiments of the present invention are described with reference to the following drawings, in which.

DETAILED DESCRIPTION

Figure 1:
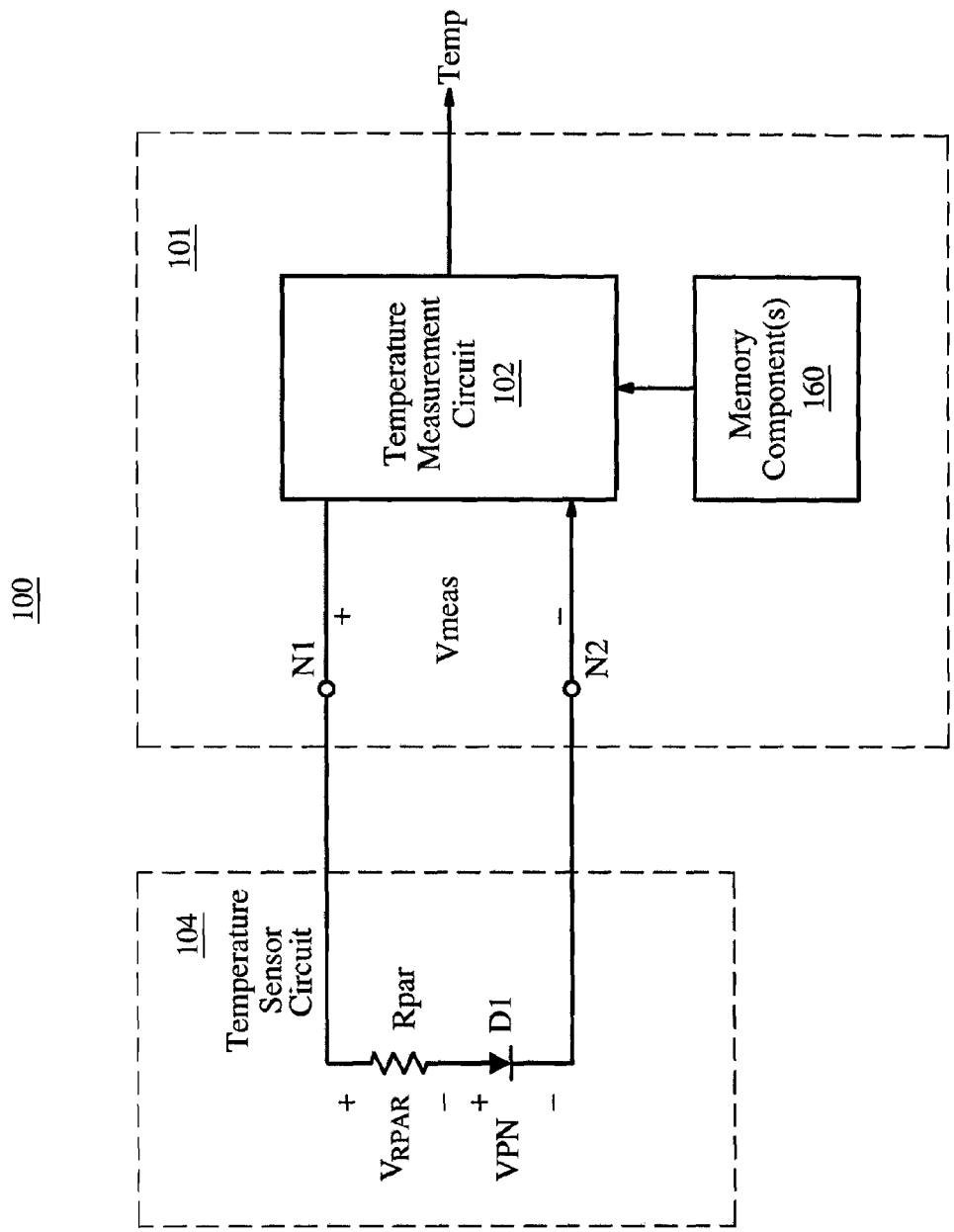
FIG. 1 shows a block diagram of an embodiment of a temperature measurement system.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a circuit for temperature sensing that provides a bias current to a PN junction. The PN junction provides a PN junction voltage in response to the bias current. Also, a parasitic resistance may be coupled in series with the PN junction. The circuit for temperature sensing is configured to determine the temperature of the PN junction based on the PN junction voltage. Further, the circuit includes registers which store ηtrim, which is based on the difference between the non-ideality of the PN junction used from a reference PN junction; ΔI, which is based on the difference between a reference bias current and the bias current for the part; Rtrim, which is based the parasitic resistance; and Ntrim, which includes other offsets. The registers may be set during trimming and/or calibration to provide accurate temperature sensing for the parameters employed.

System Overview

FIG. 1 shows a block diagram of an embodiment of a temperature measurement system 100. Temperature measurement system 100 includes temperature sensing circuit 101 and temperature sensor circuit 104. Temperature sensor circuit 104 may be located on the same substrate, or a different substrate, as the substrate containing temperature measurement circuit 102. Temperature sensor circuit 104 includes a PN junction, represented as diode D1; and may further include parasitic resistance Rpar. In one embodiment, the PN junction is provided from the base-emitter junction of a bipolar junction transistor (BJT). Temperature sensing circuit 101 includes temperature measurement circuit 102 and one or more memory component(s) 160.

In one embodiment, temperature measurement circuit 102 may be implemented, in whole or in part, on an integrated circuit. Temperature sensor circuit 104 and memory component(s) 160 may each be either internal to or external from the integrated chip.

In operation, diode D1 provides PN junction voltage VPN in response to a bias current (not shown in FIG. 1), and parasitic resistance Rpar provides voltage $V_{RPAR}$.

Temperature measurement circuit 102 is arranged to receive signal Vmeas, which is substantially given by VPN+$V_{RPAR}$. Further, temperature measurement circuit 102 is arranged to provide signal Temp, based, in part, on signal Vmeas. Signal Temp is a digital signal that indicates a temperature of a temperature sensor 104.

Additionally, temperature measurements of diode D1 are measured by applying currents, measuring resulting voltages, and calculating a temperature based on the resulting voltages. In one embodiment, the bias current is provided at two different levels to the PN junction. The currents are applied so that the PN junction in diode D1 is forward-biased. The resulting voltages across the PN junction from each applied current is sampled with temperature measurement circuit 102.

In an alternate embodiment, the voltage across the PN junction in diode D1 may be over-sampled such that many samples are taken for a selected bias current. The samples may be averaged to reduce the effects of noise and to enhance the accuracy of calculations using values derived by the analog-to-digital conversions. Samples are typically made at regular intervals such that each sample is separated from other samples by substantially equal time differences.

Temperature calculations can be determined according to the following formula:

$$Tmeas = \Delta VBE * G + (\text{offset trim})$$

where:

Tmeas=the value of the digital signal

G=a gain factor of $q/(\eta 0 \ast k \ast \ln(M))$, q=the charge of an electron;

$\Delta VBE$=change in Vmeas;

k=Boltzmann's constant;

M=ratio of, e.g., the two applied currents; and $\eta 0$=non-ideality factor of a reference PN junction.

The ratio (M) can be realized as a combination of area ratios of the PN junctions using a common current, a ratio of currents across two PN junctions that have the same area, or a combination thereof. A current ratio of M:1 results in a $\Delta VBE$ that is substantially proportional to $\ln(M)\ast\eta\ast kT/q$, as does a PN junction area ratio of M:1. In the case where the PN junctions have the same area, the change in Vmeas can be determined by subtracting the measured voltages that resulted by applying two different currents. The two PN junctions ideally should have the same PN junction temperature despite the fact that they cannot exist in the exact same physical location.

Similarly, a value for the ratio M can be achieved when only using one PN junction. (The one PN junction may include "stacked diodes" or PN junctions in parallel.) To achieve a value for the ratio M when using only one PN junction, two different currents can be successively applied to the one PN junction. Keeping the time between applications of the successive currents relatively small can reduce the magnitude of errors due to temperature drift of the one PN junction.

The gain factor G may be implemented by temperature measurement signal 102 in digital, analog, during analog-to-digital conversion, or one or more of the above. For example, the gain may be adjusted by adjusting a capacitor ratio in the A/D, by including a buffer or sample-and-hold circuit with an adjustable gain in the AFE circuit, by digitally adjusting the current ratio of bias current source circuit 110 to provide the gain, by digitally adjusting the gain of ADC circuit 114 to provide the gain, by digitally adjusting the gain of the output provided by ADC circuit 114 to provide the gain, combining or more of the above methods, and the like.

Further, temperature measurement circuit 102 is designed with parameters that are accurate for a reference PN junction having a non-ideality of $\eta 0$, a reference parasitic resistance of Rs0, and with a reference bias current of Ibiasref. Reference parameters are used so that temperature measurement circuit 102 need not be redesigned separately for each temperature sensor.

However, bias current Ibias may vary from part-to-part. Also, different users may use temperature measurement circuit 102 for different temperature sensors, which may have values for the non-ideality than $\eta 0$, and may have a different parasitic resistance than Rs0.

Previous Method

The errors above have previously treated as offset errors, to attempt to cancel out the error through offset trimming. According to this previous method, the (offset trim) term above would be, for example:

$$(\text{offset trim}) = -G \ast [(\Delta\eta \ast k \ast T0/q \ast \ln(M)) + (\Delta I \ast \Delta R)],$$

where $\Delta\eta=\eta-\eta 0$, $\Delta R=Rs-Rs0$, $\Delta I=Ibias-Ibiasref$, T0=the temperature at which the trimming is performed, $\eta$ represents the non-ideality of the actual PN junction, and Rs represents the actual parasitic resistance.

Overview of Non-Ideality Correction

However, according to one embodiment of the present invention, the non-ideality error is not corrected through offset trimming.

In one embodiment, the non-ideality error is corrected through gain correction (e.g. Tmeas=$\eta$trim$\ast(\Delta VBE \ast G)$+ (offset trim)). In another embodiment, the non-ideality error is corrected through offsetting the gain already used while providing signal Temp (e.g. Tmeas=$\Delta VBE \ast (G+\eta$trim$)$+(offset trim)). In both of these embodiments, a memory component in memory component(s) 160 is configurable to store a non-ideality value ($\eta$trim) that is based on $\eta$ and $\eta 0$, and to provide a non-ideality signal to temperature measurement circuit 102 based on $\eta$trim.

Overview of Current-Dependent Offset Correction

In one embodiment of the invention, signal Temp is provided by temperature sensing circuit 101 based, in part, on a current-dependent (i.e. dependent on $\Delta I$) offset term. In one embodiment, memory component(s) 160 is arranged to store $\Delta I$ and Rtrim, where Rtrim is based, in part, on Rs. In one embodiment, memory component(s) 160 are configurable to store $\Delta I$ and Rtrim, and to provide a current-dependent offset signal to temperature measurement circuit 102 based on $\Delta I$ and Rtrim.

In one embodiment, temperature sensing circuit 101 is configured to perform the non-ideality correction discussed above, but not the current-dependent offset correction discussed above. In another embodiment, temperature sensing circuit 101 is configured to perform the current-dependent offset correction discussed above, but not the non-ideality correction discussed above. In still another embodiment, temperature sensing circuit 101 is configured to perform both the non-ideality correction discussed above and the current-dependent offset correction discussed above.

Embodiments in which error correction is performed by providing one or more signal(s) from memory component(s) 160 to temperature measurement circuit 102, so that temperature measurement 102 corrects for the errors based on signal(s) from memory component(s) 160, have been discussed. In other embodiments, temperature measurement circuit 102 provides signal Temp with error. Subsequently, additional digital circuitry (not shown) may be employed to correct the error(s) based on memory component(s) 160.

Circuit Overview

Figure 2:
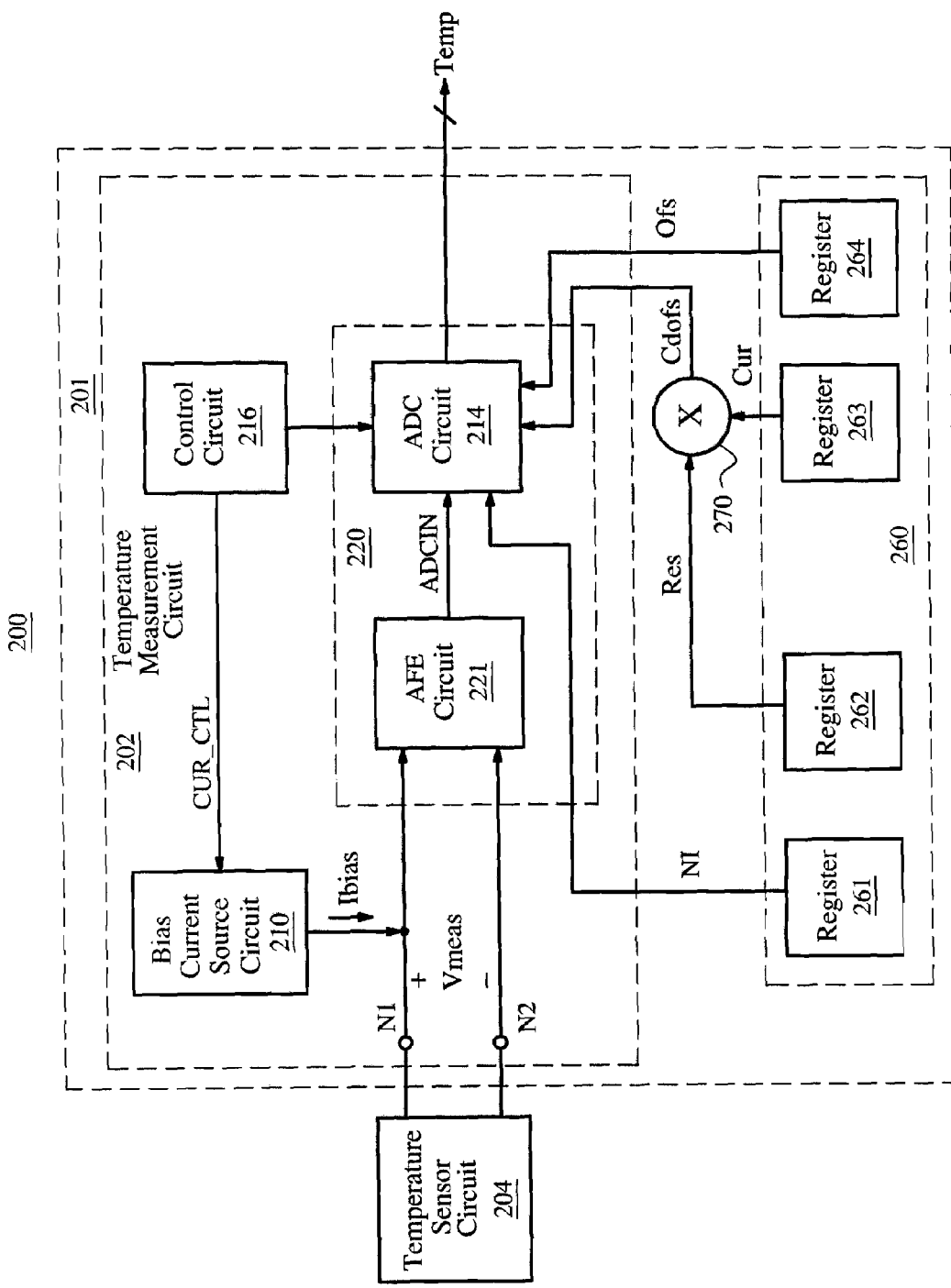
FIG. 2 illustrates a block diagram of an embodiment of the temperature measurement system of FIG. 1.

FIG. 2 illustrates a block diagram of an embodiment of temperature measurement system 200. Components in temperature measurement system 200 may operate in a similar manner to similarly-named components of temperature measurement system 100 of FIG. 1 above, and may operate in a different manner in some ways. Temperature sensing circuit 201 further includes multiplier 270. Memory components 260 may include one or more registers, such as registers 261-264. Temperature measurement circuit 202 includes bias current source circuit 210, control circuit 216, and conversion circuit 220. Conversion circuit 220 includes analog front end (AFE) circuit 221 and ADC circuit 214.

Conversion circuit 220 is arranged to provide signal Temp from voltage Vmeas, based on control by control circuit 216. Also, AFE circuit 221 is arranged to perform analog front end processing on signal Vmeas, and to provide signal ADCIN in response to the processing. In one embodiment, signal ADCIN is a differential signal. In another embodiment, signal ADCIN is a single-ended signal. In either case, ADC circuit 214 is arranged to perform an analog-to-digital conversion on signal ADCIN. Further, ADC 214 circuit may be implemented by any type of converter (e.g. flash, successive approximation, sigma-delta, and the like) that is capable of performing an analog-to digital conversion within a required time interval. In one embodiment, ADC circuit 214 provides signal Temp. In another embodiment, ADC circuit 214 provides signal ADCOUT (not shown) based on the analog-to-digital conversion of signal ADCIN, and further digital circuitry (not shown) in converter circuit 220 calculates signal Temp based on signal ADCOUT.

In one embodiment, (not shown) temperature measurement circuit 202 is arranged to implement the M:1 ratio by employing differing PN junction areas, as previously discussed. In this embodiment, control circuit 216 may be configured to control the switching of nodes N1 and N2 to the appropriate PN junctions in temperature sensor circuit 204.

In another embodiment, as illustrated in FIG. 2, control circuit 216 is arranged to provide signal CUR_CTL to implement the M:1 ratio. In this embodiment, bias current source circuit 210 is arranged such the value of current Ibias is dependent on signal CUR_CTL, and control circuit 216 is arranged to provide signal CUR_CTL to direct bias current source circuit 210 to apply two currents to an PN junction in temperature sensor 204 such that the PN junction provides voltage Vmeas at two different values. In one embodiment, the larger of the two currents is sixteen times as great as the smaller current.

Further, control circuit 216 may be implemented as a microprocessor, a microcontroller, hardwired logic, a state machine, and the like. Mathematic functions provided by control circuit 216 and/or conversion circuit 220 may be implemented as algorithms embodied in software or firmware, implemented using physical devices, or implemented as a combination of both. For example, a function for averaging may be implemented as an average calculator. An average calculator may use an adder to find the sum of input digits and then use a divider to divide the sum by the number of input digits.

Sigma-Delta Oversampling Embodiment

In one embodiment, ADC circuit 214 is a sigma-delta ADC, and the sigma-delta ADC is arranged to provide all of the gain and offset needed for signal Temp. In this embodiment, voltage Vmeas is (over)sampled K times for each time that signal Temp is determined. The M:1 ratio is employed such that half of the samples correspond to "M" and the other half correspond to "1". Further, the sigma-delta modulator circuit includes a counter. The offset is implemented by controlling the number that counter begins counting. Also, the gain of the sigma-delta ADC is substantially given by K/VREF, where VREF is a reference voltage employed in the sigma-delta ADC. The reference value for K, $K_0$, may be pre-determined according to the equation:

$$K_0 = VREF * q/(\eta 0 * k * \ln(M)).$$

Non-Ideality Trimming Embodiment

In one embodiment, memory component(s) 260 include register 261. In this embodiment, register 261 is configurable to store ηtrim. Register 261 is arranged to provide non-ideality signal NI having the value ηtrim. In an embodiment in which ηtrim is implemented as gain correction, temperature measurement circuit 102 is configured to provide signal Temp as, responsive to signal NI:

$$Tmeas = \eta term * (\Delta VBE * G) + [offset\ term(s)],$$

where the offset term(s) need not be employed in all embodiments, and the gain may be provided in analog, digital, during the analog-to-digital conversion, or any combination of the three.

Non-Ideality Trimming for Sigma-Delta Oversampling Embodiment

In an embodiment in which sigma-delta oversampling is employed, as discussed above, temperature measurement circuit 202 may be configured to provide signal Temp as, responsive to signal NI:

$$Tmeas = \Delta VBE * (K + \eta trim)/Vref + [offset\ term(s)],$$

where the offset term(s) need not be implemented in all embodiments, and the oversampling ratio is adjusted to K+ηtrim. In this embodiment, ηtrim may be pre-determined as:

$$\eta trim = VREF * q/(\eta 0 * k * \ln(M)) - K_0.$$

Current-Dependent Offset Correction Embodiment

In one embodiment, memory component(s) 260 includes registers 262 and 263. In this embodiment, register 262 is configurable to store Rtrim. In one embodiment, Rtrim corresponds to Rs*(the total gain of temperature measurement circuit 202). For example, in an embodiment in which non-ideality correction is not employed, Rtrim may be pre-determined by:

$$Rtrim = G * Rs,$$

where G=a gain factor of q/(η0*k*ln(M)). In one embodiment in which non-ideality correction is employed as a gain correction factor ηtrim, Rtrim may be given by:

$$Rtrim = \eta trim * G * Rs.$$

Further, register 263 may be configured to store ΔI. Register 263 may be further configured to provide signal Cur having the value ΔI. Multiplier 270 may be configured to provide current-dependent offset signal Cdofs from signals Res and Cur, such that signal Cdofs has a value of substantially Rtrim*ΔI. Also, ADC circuit 214 may be arranged to provide signal Temp such that signal Temp includes an offset of −Rtrim*ΔI.

Current-Dependent Offset Correction for Sigma-Delta Oversampling Embodiment

In one embodiment in which sigma-delta oversampling and non-ideality correction are both implemented, Rtrim may be pre-determined by:

$$Rtrim = Rs * (K_0 + \eta trim)/VREF.$$

Additional Offset Trimming

In some embodiments, memory component(s) 260 include register 264. In these embodiments, register 264 is configured to store an Ntrim value, which is pre-determined by trimming after all of the other registers in memory component(s) 260 have been determined. Register 264 is further configured to provide signal Ofs having the value Ntrim. In this embodiment, ADC circuit 214 is further configured to provide signal Temp such that signal Temp is offset by −Ntrim.

In one embodiment, memory component(s) 260 includes at least registers 262, 263, and 264. In this case, ADC circuit 214 is configured to provide (based on received signals from memory component(s) 260) signal Temp with a total offset of:

$$[offset\ term(s)] = -Rtrim * \Delta I - Ntrim.$$

In another embodiment, memory component(s) 260 includes registers 261 and 264, but do not include registers 262 and 263. In this case, ADC circuit 214 is configured to provide (based on received signals from memory component(s) 260) signal Temp with a total offset of:

[offset term(s)]=−Rtrim*ΔI.

In yet another embodiment, memory component(s) 260 includes register 261 but does not include registers 262, 263, or 264. In this case, there is substantially no offset, and the expression "[offset term(s)]" in the non-ideality equations above can be omitted.

Registers

During the factory trimming, a reference temperature sensor having a non-ideality of η0 and a parasitic resistance of Rs0 is used.

In one embodiment, the error correction employed by temperature sensing circuit 201 is done entirely by factory trimming. In this embodiment, registers included in memory component(s) 260 are set during the factory trimming, and are not adjustable thereafter. In this embodiment, the user may specify η and Rs so that registers 261 and 262 may be properly set for the factory trimming.

In other embodiments, one or more of the register(s) in memory component(s) 260 is a writable register. Accordingly, a user may write or overwrite a value into such writable registers. Preferably, register 263 and 264 are not writable by the user, so that ΔI errors and system offset errors are corrected transparently for the user. However, in one embodiment, registers 263 and/or 264 are writable registers.

In an embodiment in which registers 261 and 262 are writable registers, the user may configure the registers according to η and Rs of the PN junction in the temperature sensor that the user employs.

ALTERNATIVE EMBODIMENTS

Many alternative embodiments are within the scope and spirit of the invention. For example, as discussed above, error correction may be performed by digital circuitry after signal Temp has been provided by temperature measurement circuit 202, rather than performing the error correction while provided signal Temp. As another example, the gain and offset adjustments may be implemented in hardware, software, a combination of hardware and software, and the like.

EMBODIMENT OF A BIAS CIRCUIT

Figure 3:
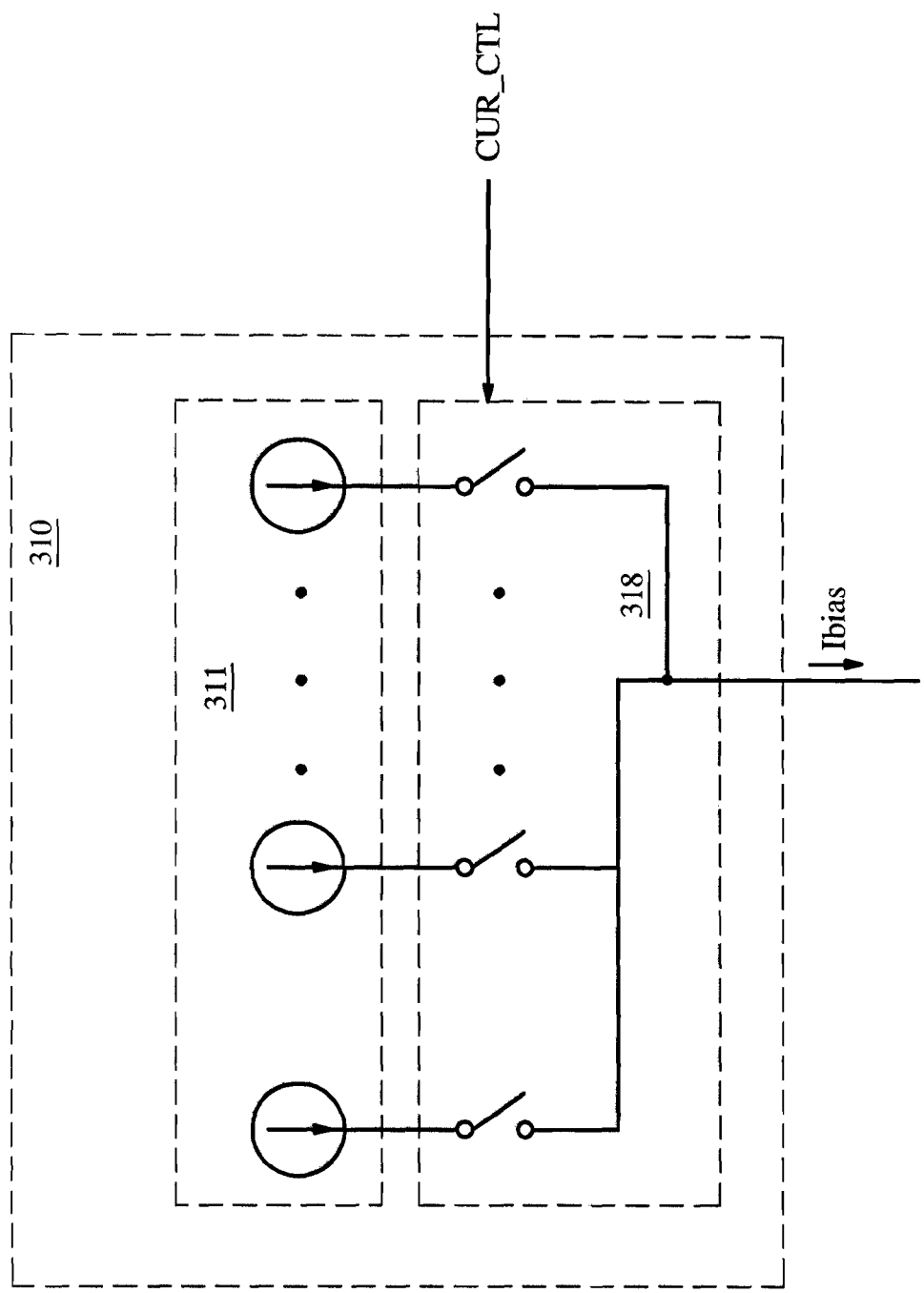
FIG. 3 shows a block diagram of an embodiment of the bias current source circuit of FIG. 2, in accordance with aspects of the invention.

FIG. 3 shows a block diagram of an embodiment of bias current source 310. Bias current source 310 may be employed as an embodiment of bias current source 210 of FIG. 2. Bias current source circuit 310 includes current sources 311 and switch array 318.

Switch array 318 is coupled between the outputs of current sources 311 and node N1. Switch array 318 is arranged to provide at least two levels of current by selectively coupling one or more current sources among current sources 311 to node N1. In one embodiment, there are 16 current sources in current sources 311, and a current density ratio of 16-to-1 is provided by selectively switching on one or all of the 16 current sources when current sources 311 each have equal current densities. Also, individual current sources may be activated at different times such that a desired programmable current level may be realized by selectively activating different current sources. For example, each current source can be activated sequentially for temperature measurements such that the same current density is provided from differing current sources. The current sources may be sized differently such that integer and noninteger current ratios of greater than one can be achieved.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for temperature sensing, comprising:
    providing a bias current to a temperature sensor that includes at least one PN junction;
    providing a diode non-ideality signal that is based on a non-ideality of the at least one PN junction and a non-ideality of a reference PN junction; and
    providing a digital signal that indicates a temperature of the temperature sensor, based, in part, on a PN junction voltage received from the temperature sensor in response to the bias current, and further based on the diode non-ideality signal such that the digital signal is substantially scaled according to the diode non-ideality signal.

2. A method for temperature sensing, comprising:
    providing a bias current to a PN junction, wherein a parasitic resistance is coupled in series with the PN junction;
    providing a current-dependent offset cancellation signal having a value that is substantially equal to ΔI*Rtrim, wherein ΔI represents a difference between the bias current and a reference bias current; and wherein Rtrim is based, in part, on the parasitic resistance; and
    providing a digital signal that indicates a temperature of the PN junction, based, in part, on a voltage of the PN junction; and further based on the current-dependent offset cancellation signal such that the digital signal is substantially offset by ΔI*Rtrim.

3. The method of claim 2, further comprising:
    providing another offset cancellation signal, wherein providing the digital signal is further accomplished such that the digital signal is further based on said another offset cancellation signal such that digital signal is substantially offset by a total offset of ΔI*Rtrim+Ntrim, where Ntrim represents a value of said another offset cancellation signal.

4. The method of claim 2, wherein Rtrim is substantially equal to Rs*G, where Rs represents the parasitic resistance, G represents a gain factor that is substantially given by G=q/(η0*k*ln(M)), η0 represents the non-ideality factor of a reference PN junction, k represents Boltzmann's constant, q represents the charge of an electron, and M represents a ratio that is associated with the PN junction voltage.

5. The method of claim 2, further comprising:
    providing a non-ideality signal having a non-ideality value that is based on a non-ideality of the PN junction, wherein providing the digital signal is further accomplished such that at least a non-offset portion of the digital signal is substantially proportional to the non-ideality value.

6. The method of claim 2, wherein providing the current-dependent offset cancellation signal is accomplished by:
    storing a current offset value that corresponds to ΔI;
    storing a resistor trim value that corresponds to Rtrim; and
    providing the current-dependent offset value based on the stored current offset value and the stored resistor value.

7. The method of claim 2, wherein providing the digital signal is accomplished by:
   sampling the PN junction voltage a plurality of times;
   providing the bias current such that the bias current corresponds to a first current during a portion of the plurality of times, and corresponds to a second current during a another portion of the plurality of times, wherein the ratio of the first current to the second current is M:1;
   each of the plurality of times that the PN junction voltage is sampled:
      receiving a measured voltage that substantially corresponds to the PN junction voltage plus a voltage that is associated with the parasitic resistance;
      performing analog processing on the measured voltage to provide a processed PN junction voltage; and
      converting the processed PN junction voltage into a digital sampled value; and
   after sampling the PN junction voltage a plurality of times, providing the digital signal based on each of the digital sampled values.

8. The method of claim 7, wherein providing the digital signal is accomplished substantially according to the equation:
   Tmeas=q*$\Delta$VBE/($\eta$0*k*ln(M))−$\Delta$I*Rtrim, where Tmeas represents a value of the digital signal, $\Delta$VBE represents the difference in the PN junction voltage during the portion of the plurality of times and the PN junction voltage during other portion of the plurality of times, $\eta$0 represents the non-ideality factor of a reference PN junction, k represents Boltzmann's constant, and q represents the charge of an electron.

9. The method of claim 7, further comprising:
   providing a non-ideality signal having a non-ideality value that is based on a non-ideality of the PN junction, wherein providing the digital signal is further accomplished such that at least a non-offset portion of the digital signal is substantially proportional to the non-ideality value; and
   providing another offset cancellation signal, wherein providing the digital signal is further accomplished such that the digital signal is further based on the other offset cancellation signal such that digital signal is substantially offset by a total offset of $\Delta$I*Rs+Ntrim, where Ntrim represents a value of the other offset cancellation signal, and wherein providing the digital signal is accomplished substantially according to the equation:
   Tmeas=$\eta$trim*[q*$\Delta$VBE/($\eta$0*k*ln(M))]−$\Delta$I*Rtrim−Ntrim, where Tmeas represents a value of the digital signal; $\Delta$VBE represents a difference in the PN junction voltage during the portion of the plurality of times and the PN junction voltage during other portion of the plurality of times; $\eta$0 represents a non-ideality factor of a reference PN junction, k represents Boltzmann's constant; q represents the charge of an electron; and $\eta$trim represents a value of the non-ideality signal, wherein the value of the non-ideality signal is substantially equal to a ratio of the non-ideality of the PN junction to the non-ideality of the reference PN junction, and wherein Rtrim is substantially equal to Rs*$\eta$trim*[q/($\eta$0*k*ln(M))], where Rs represents the parasitic resistance.

10. A circuit for temperature sensing, comprising:
   a temperature measurement circuit that is arranged to provide a digital signal that indicates a temperature of a temperature sensor that includes at least one PN junction, based, in part, on a PN junction voltage of the temperature sensor; and further based on a diode non-ideality signal such that the digital signal is substantially scaled according to the diode non-ideality signal; and
   a memory component that is configurable to store a diode non-ideality value that is based on a non-ideality of the at least one PN junction and a non-ideality of a reference PN junction, and arranged to provide the diode non-ideality signal based on the diode non-ideality value.

11. The circuit of claim 10, wherein the temperature measurement circuit includes a bias current source that is configured to provide a bias current to the temperature sensor, the memory component is a first register that is configurable to store the diode non-ideality value, and wherein the circuit for temperature sensing further comprises:
   a second register that is configurable to store a resistor value that corresponds to Rtrim, wherein Rtrim is based, in part, on a parasitic resistance that is coupled in series with the at least one PN junction; and
   a third register that stores a current offset value that corresponds to $\Delta$I, wherein $\Delta$I represents a difference between the bias current and a reference current, and wherein the temperature measurement circuit is arranged to provide the digital signal such that the PN junction is further based on the resistor value and the current offset value such that the digital signal is substantially offset by $\Delta$I*Rtrim.

12. The circuit of claim 11, further comprising:
   A fourth register that stores another offset value, wherein the temperature measurement circuit is arranged to provide the digital signal such that the digital signal is further based on said another offset value such that a total offset of the digital signal is substantially given by $\Delta$I*Rtrim+Ntrim, where Ntrim represents the other offset value.

13. The circuit of claim 10, wherein the temperature measurement circuit includes a bias current source that is configured to provide a bias current to the PN junction, and wherein the temperature measurement circuit further includes:
   a control circuit; and
   a converter circuit, including:
      an analog front-end processing circuit that is arranged to receive a measured voltage that substantially corresponds to the PN junction voltage, and further arranged to provide a processed signal from the measured PN junction voltage; and
      an analog-to-digital converter circuit that is arranged to convert the processed signal into a digital sampled value, wherein the digital signal is based, in part, on the digital sampled value.

14. The circuit of claim 13, wherein at least one of the bias current circuit source, the analog front-end processing circuit, and the analog-to-digital converter circuit is arranged to provide a gain that is based on the non-ideality signal to provide the substantial scaling of the digital signal.

15. The circuit of claim 13, wherein the converter circuit further includes a digital processing component, wherein the digital processing component is arranged to provide the digital signal based, in part, on the digital sampled value, the digital processing component is arranged to provide a gain that is based on the diode non-ideality value to provide the substantial scaling of the digital signal, and wherein the diode non-ideality value corresponds to a ratio of the non-ideality of the at least one PN junction to the non-ideality of the reference PN junction.

16. The circuit of claim 13, wherein the temperature measurement circuit is configured to provide the digital signal by performing actions, including:
sampling the PN junction voltage a plurality of times; and
controlling the PN junction voltage such that a difference of the PN junction voltage during a portion of the plurality of times to the PN junction voltage during another portion of the plurality of times is substantially given by $\ln(M)*\eta*k*T/q$, where M represents a predetermined number, $\eta$ represent a non-ideality of the PN junction, k represents Boltzmann's constant, T represents the absolute temperature of the PN junction, and q represents the charge of an electron.

17. The circuit of claim 16, wherein
the bias current source is arranged to provide the bias current such that the bias current corresponds to a first current if a current control signal corresponds to a first value, and such that the bias current corresponds to a second current if the current control signal corresponds to the second value, wherein a ratio of the first current to the second current is M:1;
and wherein the control circuit is arranged to control the PN junction voltage by providing the current control signal such that the bias current corresponds to the first current during the portion of the plurality of times, and corresponds to a second current during the other portion of the plurality of times.

18. The circuit of claim 16, wherein the temperature measurement circuit is configured to control the PN junction voltage by providing the bias current to a first PN junction of the at least one PN junction during the plurality of times and providing the bias current to a second PN junction of the at least one PN junction during the other plurality of times, wherein the ratio of the area of the first PN junction to the area of the second PN junction is substantially equal to M:1.

19. The circuit of claim 16, wherein temperature measurement circuit is configured to provide the digital signal according to the equation:
Tmeas=$\Delta$VBE*G, where Tmeas represents a value of the digital signal; $\Delta$VBE represents the difference in the PN junction voltage during the portion of the plurality of times and the PN junction voltage during other portion of the plurality of times; G is substantially given by G=GA*GAD*GD, GA represents a gain provided by the analog front-end processing circuit; GAD represents a gain provided by the analog-to-digital conversion circuit; GD represents gain applied after the analog-to-digital conversion, if any; and G is one of predetermined and adjusted such that G is substantially given by:
G=$\eta$trim*[q/($\eta 0$*k*ln(M))], where $\eta 0$ represents a non-ideality of a reference PN junction, and $\eta$trim represents the diode non-ideality value, wherein the diode non-ideality value is substantially equal to a ratio of the non-ideality of the PN junction to the non-ideality of the reference PN junction.

20. The circuit of claim 16, further comprising:
a second register that is configurable to store a resistor value that corresponds to Rtrim, wherein Rtrim is based, in part, on a parasitic resistance that is coupled in series with the PN junction; and
a third register that stores a current offset value that corresponds to $\Delta$I, wherein $\Delta$I represents a difference between the bias current and a reference current, and wherein the temperature measurement circuit is arranged to provide the digital signal such that the PN junction is further based on the resistor value and the current offset value;
a fourth register that stores another offset value, wherein the analog-to-digital converter circuit includes a sigma-delta analog-to-digital converter circuit that is arranged to perform an analog-to-digital conversion on the processed signal; the temperature measurement circuit is arranged to provide the digital signal such that the digital signal is further based on the other offset value such that a total offset of the digital signal is substantially given by $\Delta$I*Rtrim+Ntrim, where Ntrim represents to the other offset value; and wherein temperature measurement circuit is configured to provide the digital signal according to the equation:
Tmeas=$\Delta$VBE*(K$_0$+$\eta$trim)/VREF−$\Delta$I*Rtrim−Ntrim,
where Tmeas represents a value of the digital signal; $\Delta$VBE represents the difference in the PN junction voltage during the portion of the plurality of times and the PN junction voltage during the other portion of the plurality of times; $\eta$trim represents the diode non-ideality value; VREF represents a reference voltage; and K$_0$ is substantially pre-determined according to the equation:

$K_0 = VREF*q/(\eta 0*k*\ln(M))$, where $\eta 0$ represents the non-ideality factor of the reference PN junction, wherein the control circuit is arranged to control the sigma-delta analog-to-digital converter circuit such that K$_0$+$\eta$trim clock cycles are employed during one of the analog-to-digital conversion and an oversampling of the PN junction voltage, wherein $\eta$trim is pre-determined substantially according to the equation:

$\eta\text{trim} = VREF*q/(\eta 0*k*\ln(M)) - K_0$, and wherein Rtrim is pre-determined substantially according to the equation:

$R\text{trim} = Rs*(K_0+\eta\text{trim})/VREF$.

* * * * *

UNITED STATES PATENT AND TRADEMARK OFFICE
CERTIFICATE OF CORRECTION

| | |
|---|---|
| PATENT NO. | : 7,309,157 B1 |
| APPLICATION NO. | : 10/952514 |
| DATED | : December 18, 2007 |
| INVENTOR(S) | : Aslan et al. |

It is certified that error appears in the above-identified patent and that said Letters Patent is hereby corrected as shown below:

Column 10, line 32, in Claim 12, delete "A" and insert -- a --, therefor.

Column 11, line 13, in Claim 16, after "η" delete "represent" and insert -- represents --, therefor.

Signed and Sealed this

Twenty-ninth Day of April, 2008

JON W. DUDAS
*Director of the United States Patent and Trademark Office*